United States Patent [19]
Bisconti

[11] Patent Number: 5,837,174
[45] Date of Patent: Nov. 17, 1998

[54] INJECTION MOULDING PROCESS FOR SOLES IN EXPANSIBLE AND CROSS-LINKING "EVA" BASED COMPOUNDS

[75] Inventor: Bruno Bisconti, Civitanova Marche, Italy

[73] Assignee: Finproject -S.P.A., Rome, Italy

[21] Appl. No.: 806,631

[22] Filed: Feb. 26, 1997

[30] Foreign Application Priority Data

Apr. 19, 1996 [IT] Italy ................................ AN96A0008

[51] Int. Cl.⁶ ..................................................... B29C 44/02
[52] U.S. Cl. ........................ 264/54; 264/321; 264/342 R; 264/DIG. 71
[58] Field of Search ............................ 36/28; 264/342 R, 264/321, 54, 237, DIG. 71

[56] References Cited

U.S. PATENT DOCUMENTS

| | | | |
|---|---|---|---|
| 3,758,916 | 9/1973 | Wetmore | 264/342 R |
| 4,179,319 | 12/1979 | Lofdahl | 264/342 R |
| 4,476,084 | 10/1984 | Takada et al. | 264/237 |
| 4,680,875 | 7/1987 | Danieli | 36/28 |
| 5,141,578 | 8/1992 | Yang | 264/45.1 |
| 5,308,420 | 5/1994 | Yang | 264/45.1 |
| 5,318,645 | 6/1994 | Yang | 264/45.1 |
| 5,467,536 | 11/1995 | Ramer et al. | 36/28 |
| 5,619,809 | 4/1997 | Sessa | 36/28 |

*Primary Examiner*—Allan R. Kuhns
*Attorney, Agent, or Firm*—Beveridge, DeGrandi, Weilacher & Young, LLP

[57] ABSTRACT

An injection molding process for soles using expansible and cross-linking EVA based compounds. During the cooling stage of the molded sole, the spontaneous shrinkage of the molded sole is arrested by means of a template placed on the sole. To accomplish this, a series of perimeter pin elements extend from the bottom surface of the template and are coupled with a corresponding series of perimeter holes defined on the upper surface of the sole. The dimensions of the sole therefore will reduce no further either during the remaining cooling phase or after cooling.

2 Claims, 1 Drawing Sheet

INJECTION MOULDING PROCESS FOR SOLES IN EXPANSIBLE AND CROSS-LINKING "EVA" BASED COMPOUNDS

This patent application concerns an injection moulding process for soles in expansible and cross-linking "EVA" based compounds.

The abbreviation "EVA" refers to "vinyl-acetate ethylene copolymer" which, according to the type of additive used, may be thermoplastic or expansible and cross-linking.

In the case of the latter type, an expanding powder additive is used which decomposes at a specific temperature to produce gases which give rise to a typical phenomenon which occurs in injection moulding using this type of EVA, consisting of the instantaneous expansion of the part as soon as the mould is opened.

In particular the dimensions of the part increase rapidly while the proportions and shape remain unaltered thus maintaining a ratio of perfect similarity with the impression of the matrix.

Expansible and cross-linking EVA, thanks above all to its low cost, is widely used in the footwear sector for the production of inexpensive injection moulded soles.

It is not however currently possible with this material to mould soles with a raised trim along the sides since the expansion of the part when the mould is opened requires the perimeter of the sole to be milled in order to reduce the sole to the necessary dimensions.

In other words, since it is not possible to control this expansion precisely, it is currently necessary to dimension -according to the expansion ratio of the material and that of its shrinkage during cooling -the impression of the mould so that the cooled moulded sole is slightly oversized with respect to the nominal dimensions of the desired sole sizes, which are obtained by milling away a surface layer of material along the entire perimeter of the sole.

It is thus obvious why this material and moulding system can not be used for soles which have a raised trim, such as a welt, a part or all of which would be removed when the sides of the sole are milled.

The purpose of this invention is to design an injection moulding process for soles made of expansible and cross-linking "EVA" that makes it possible to produce a perfectly sized sole and to eliminate the costs and limitations of the milling which is currently necessary to size soles made of expansible and cross-linking EVA compounds.

The process according to the invention derives from an idea for a solution which is, in general terms, exactly opposite to that on which current production techniques are based.

According to this innovative idea, based on the expansion ratio of the material and that of its shrinkage during cooling, the impression of the mould is designed so that the moulded sole is slightly undersized after cooling and shrinkage with respect to the nominal dimensions of the desired size. The desired size is then achieved by arresting the spontaneous shrinkage of the sole during cooling.

For this purpose, the process according to the invention involves the use of a template consisting of a thin and flexible plate from whose bottom edge project a series of perimeter pin elements which may integrally join or couple the template with the sole, which is in turn provided on its upper surface with a series of perimeter holes corresponding to the above pin elements. It follows that the coupling of the sole and template must occur before the cooling process of the sole is completed and when said series of holes, drawn together by the gradual shrinkage of the sole during cooling, are positioned exactly over the template pin elements, which after being received in the respective holes, prevent any further shrinkage of the sole, whose dimensions reduce no further either during or after cooling.

BRIEF DESCRIPTION OF THE DRAWINGS

The description of the process according to the invention continues with reference to the enclosed drawings which are intended for purposes of illustration and not in a limiting sense and which schematically show the moulded sole before and after shrinkage following cooling, whereby.

DETAILED DESCRIPTION OF THE INVENTION

Before describing the operating stages of the moulding process according to the invention, it is important to remember that in order to realise the process according to the invention, the impression of the sole must be designed to ensure that the sole off the mould after complete and spontaneous shrinkage would be slightly undersized with respect to the nominal dimensions of the size in question if the template is not used.

Moreover the impression of the mould must be designed so that the sole off the mould, regardless of its shape or pattern of the treading surface and its sides, has a a series of perimeter holes on its upper surface.

This being so, the actual moulding process is attained according to current technology by injecting granules of expansible and cross-linking EVA compound into a mould, maintained at a specific temperature to ensure that during the time the material remains in the mould, cross-linking and decomposition of the expanding fillers, occur.

Figure 1:
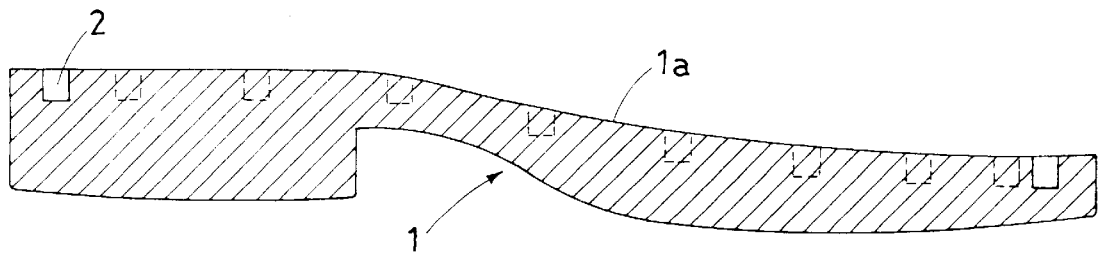
FIG. 1 is a cross-section along a longitudinal plane of the sole injected with expansible and cross-linking EVA compounds immediately off the mould in maximum expansion dimensions.
Figure 3:
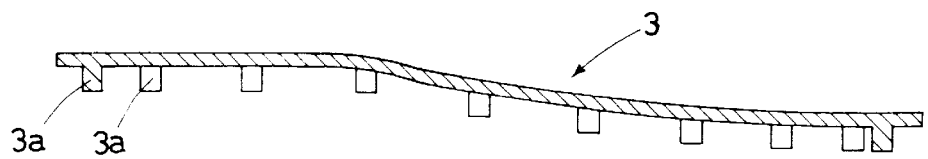
FIG. 3 is a cross-section of the sole in FIG. 2 along a longitudinal plane III—III.
Figure 2:
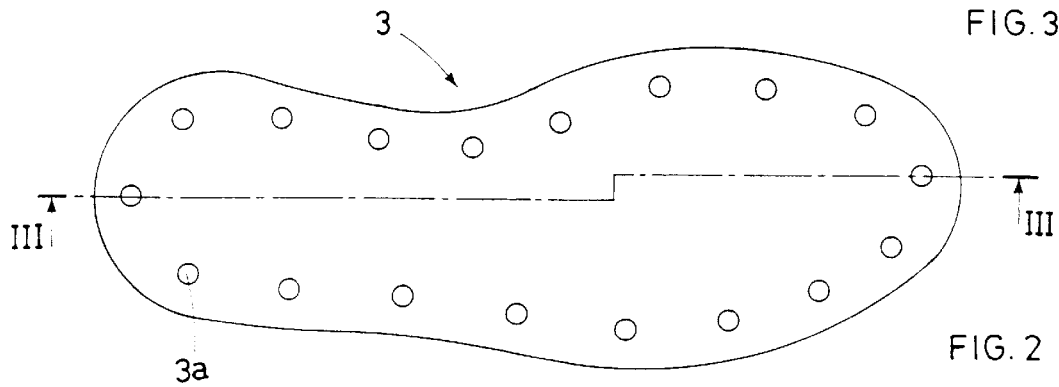
FIG. 2 is a view from the bottom of the above template designed to arrest the shrinkage of the sole during the post-moulding stage.
Figure 4:
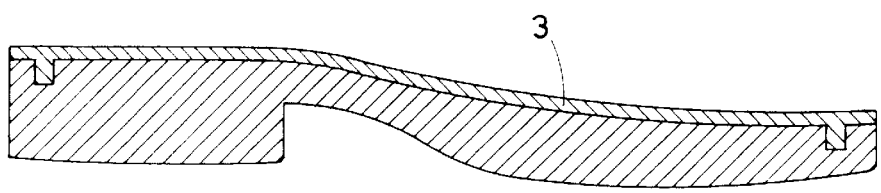
FIG. 4 is a view of the template positioned on the sole both cross-sectioned along a longitudinal plane.

This conventional moulding phase produces a sole of the type illustrated in FIG. 1 which, as mentioned above, shows the sole in the maximum dimensions of expansion, that the sole attains immediately the mould is opened.

As can be seen in FIG. 1, sole (1) is characterised by a series of perimeter holes (2) along its upper surface (1a).

The process according to the invention provides that the sole (1) during cooling is coupled with a template (3) consisting of a thin flexible plate made of a rigid material such as rigid P.V.C., having a profile similar to that of the sole (1). The template (3) has a series of pin elements (3a) projecting from its bottom surface corresponding to the series of holes (2) on sole (1), and into which, before completion of the cooling process, the corresponding pin elements (3a) of the template (3) are inserted in this way preventing any further shrinkage of the sole, whose dimensions reduce no further either during or after cooling.

Figure 5:
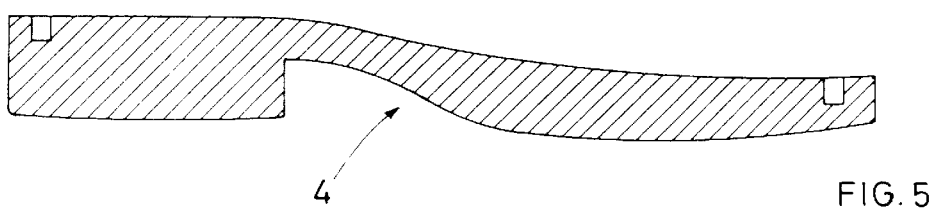
FIG. 5 is a cross-section along a longitudinal plane, of the sole produced with the moulding system according to the invention.

After cooling, the pin elements (3a) of the template (3) are detached from the corresponding holes (2) on the sole. The sole (4) thus obtained, is shown in FIG. 5, with the same shape but reduced dimensions with respect to the sole (1) shown in FIG. 1.

Finally, in order to ensure the perfect entry of the pin elements (3a) of the template (3) into the holes (2) on the sole (1), the process according to the invention provides that a slight pressure be created on the template (3), during cooling, by any suitable means. The most convenient and simplest of which may consist of small weights placed on the template (3).

I claim:

1. An injection moulding process for soles produced with expansible and cross-linking "EVA" based compounds, comprising:

injecting expansible and cross-linking EVA based compound granules into a mould whose impression is sized to ensure that the sole off the mould after spontaneous and complete shrinkage is slightly undersized with respect to dimensions of a desired sole size, and is designed so that said moulded sole has a series of perimeter holes on its upper surface;

coupling a template on the upper surface of the sole during cooling, said template comprised of a thin flexible plate made of a rigid material having a profile similar to that of the sole and having provided on its bottom surface a series of pin elements designed to fit into the corresponding series of holes of the sole maintaining said pin elements in the holes until the cooling process of the sole is completed; and extracting said pin elements of the template from the holes of the sole, after cooling.

2. A process according to claim 1, further comprising:

subjecting the template to a slight pressure to ensure entry of the pin elements in the holes on the upper surface of the sole.

* * * * *